Sept. 21, 1965 C. W. WEILAND 3,207,246
IMPELLER AND DUCTING SYSTEM FOR PERIPHERAL
JET GROUND EFFECT VEHICLE
Filed Feb. 24, 1961 6 Sheets-Sheet 1
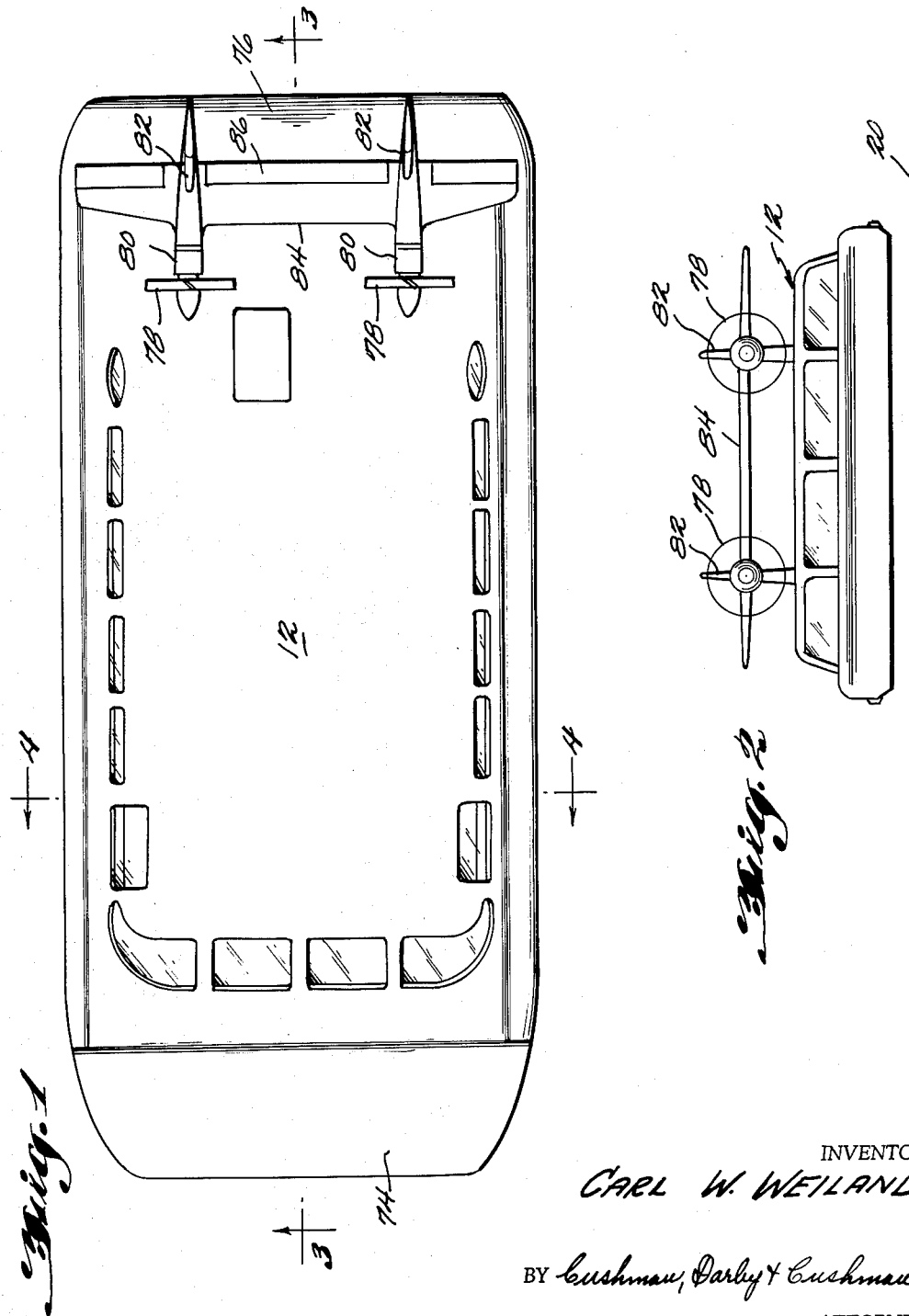
INVENTOR
CARL W. WEILAND
BY Cushman, Darby & Cushman
ATTORNEYS

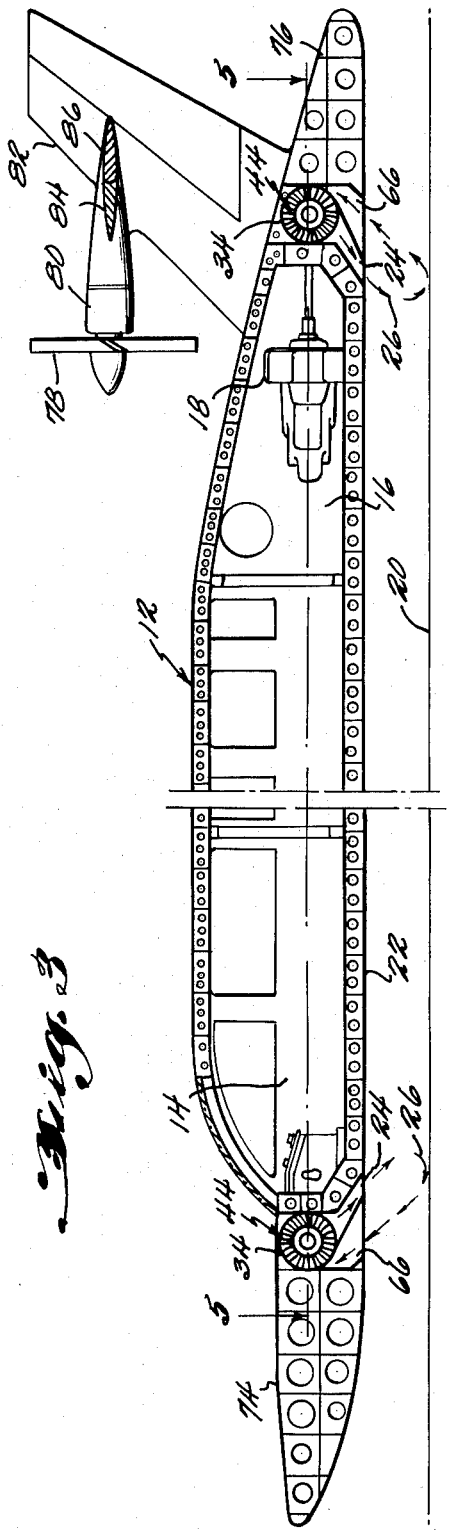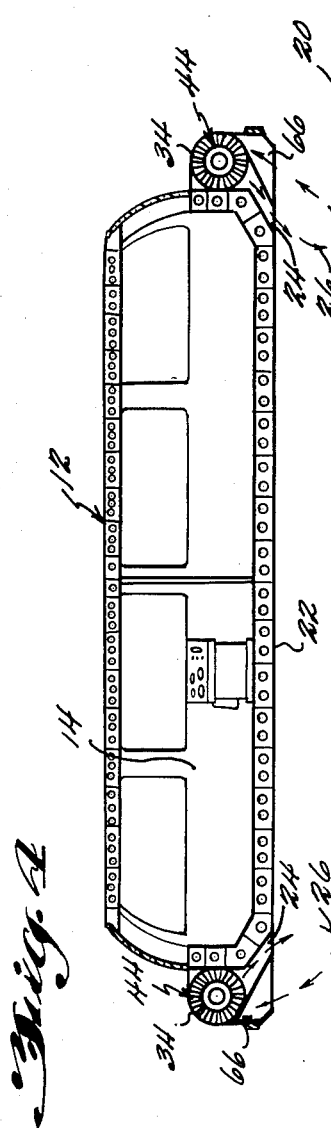

Sept. 21, 1965 C. W. WEILAND 3,207,246
IMPELLER AND DUCTING SYSTEM FOR PERIPHERAL
JET GROUND EFFECT VEHICLE
Filed Feb. 24, 1961 6 Sheets-Sheet 3
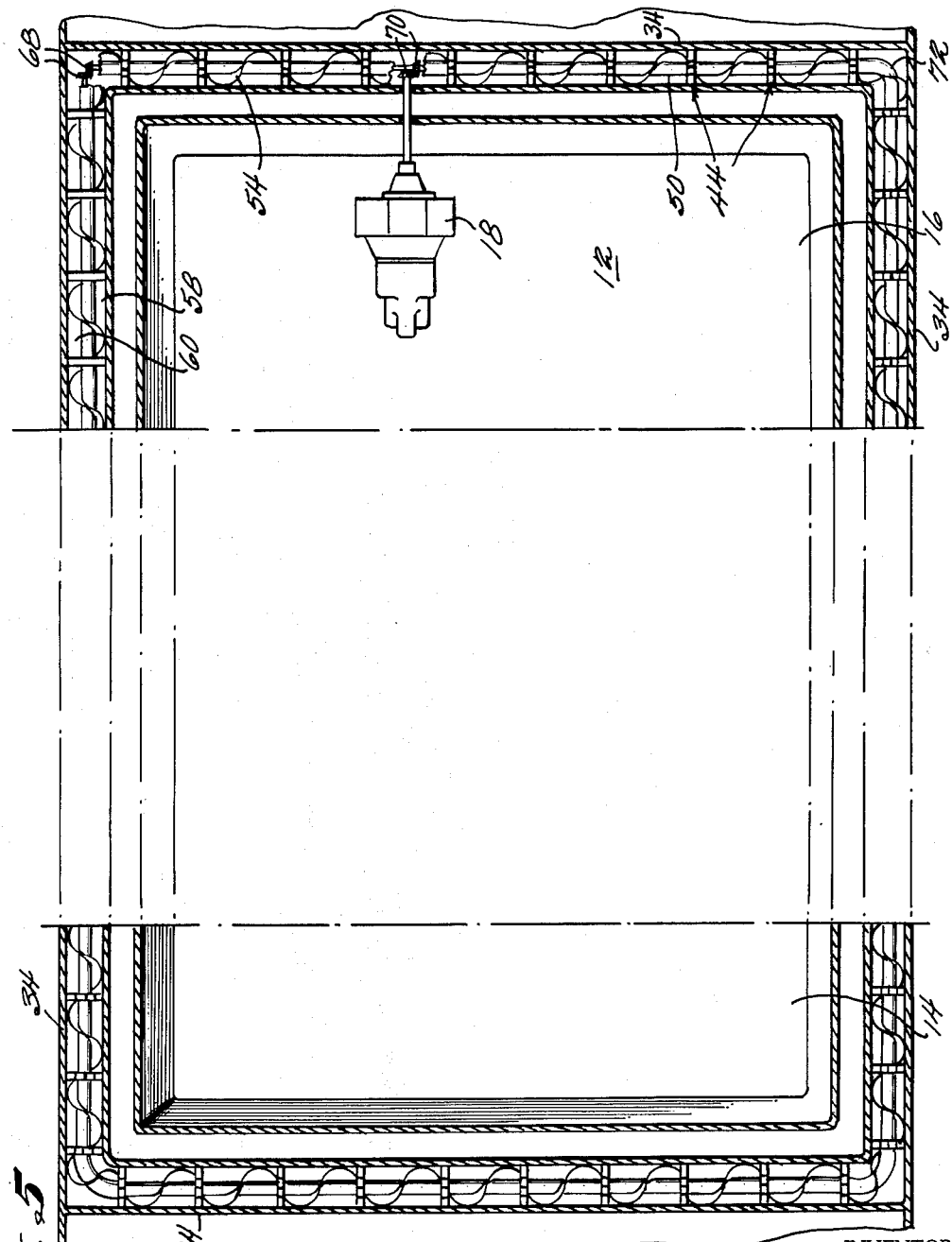
INVENTOR
CARL W. WEILAND
BY Cushman, Darby & Cushman
ATTORNEYS

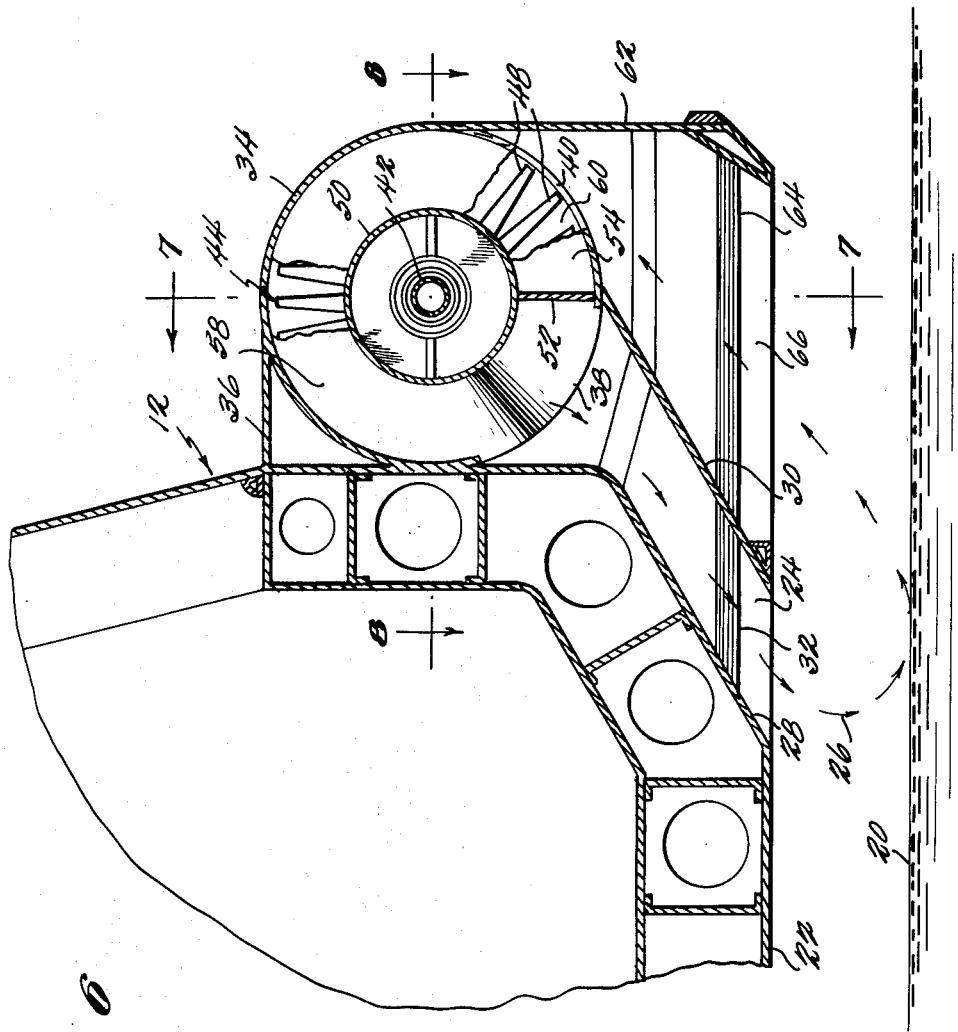

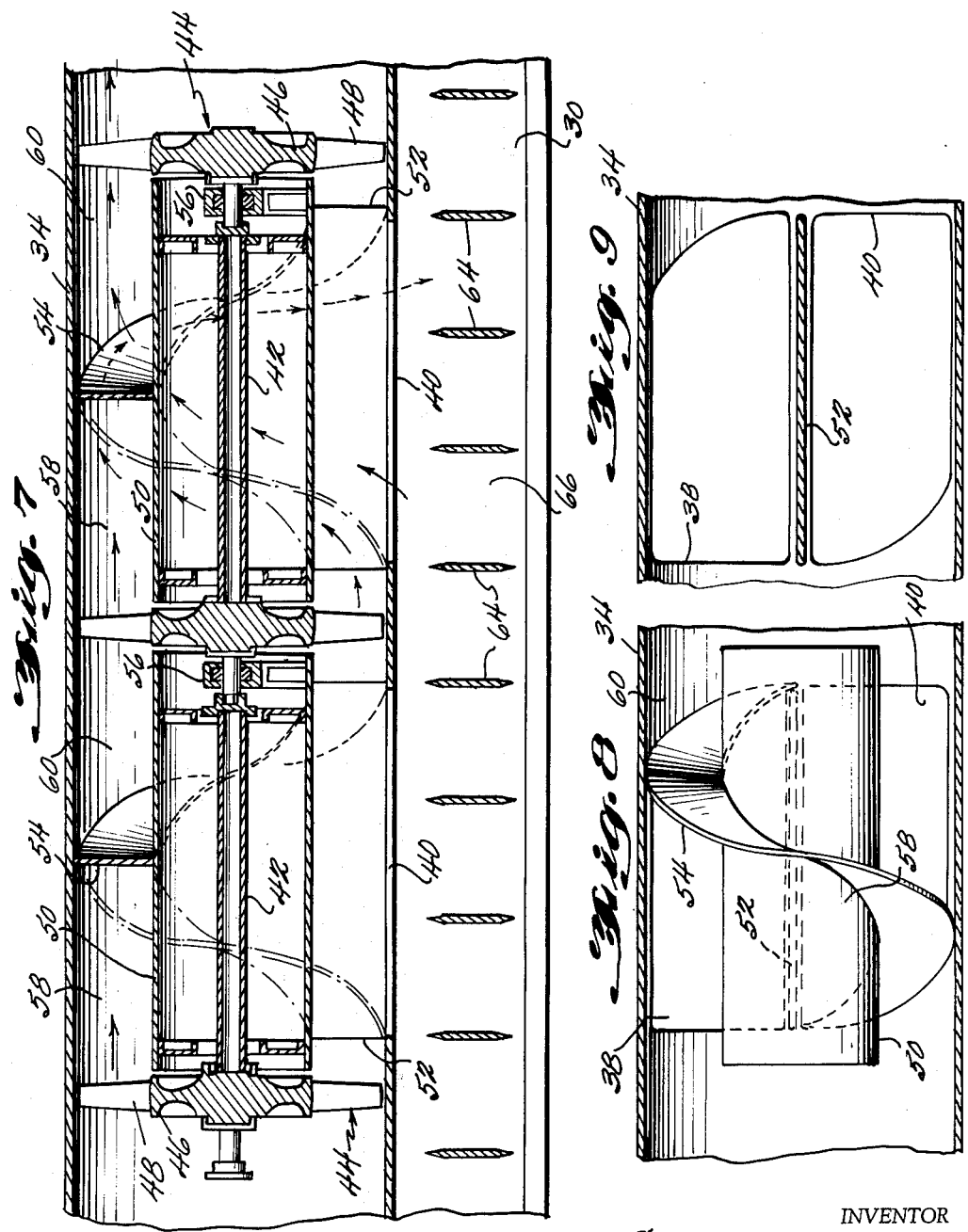

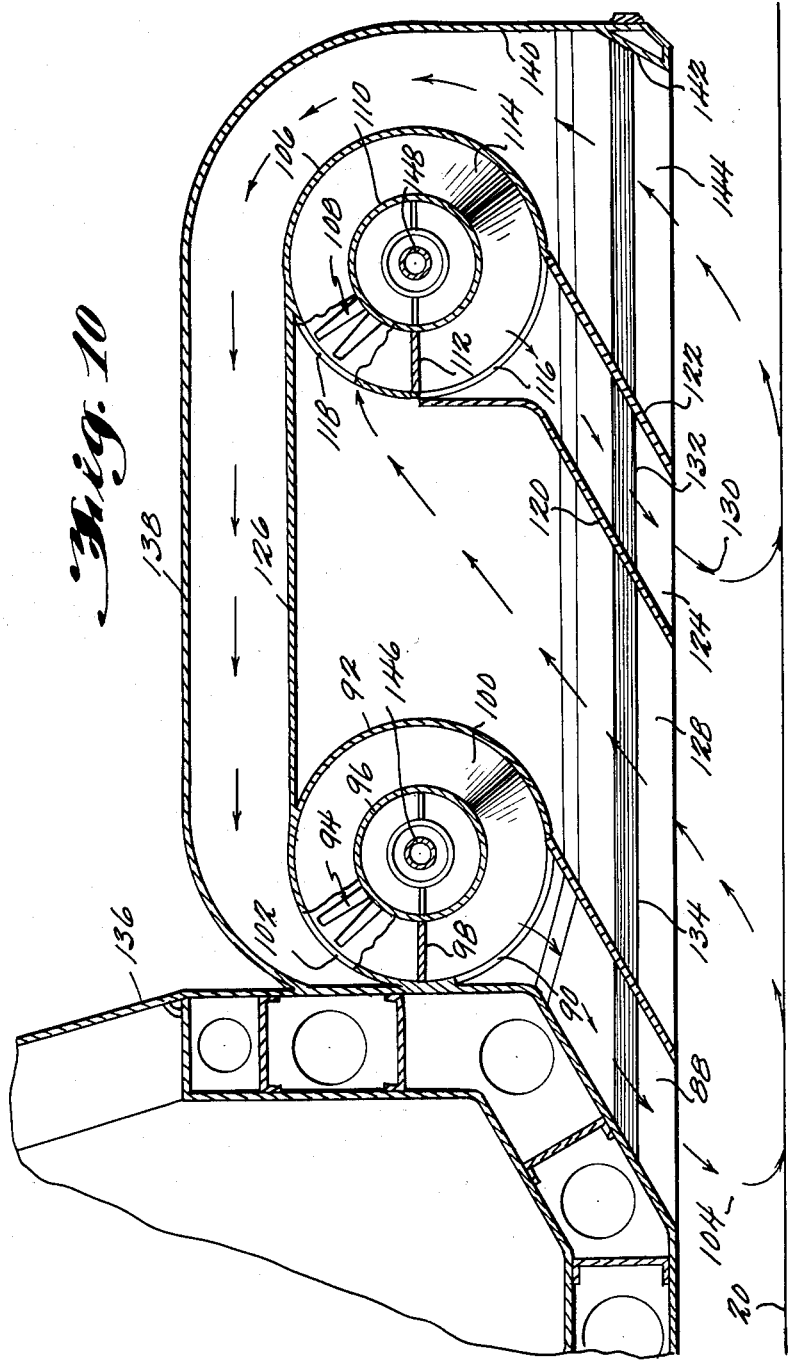

United States Patent Office 3,207,246
Patented Sept. 21, 1965

3,207,246
IMPELLER AND DUCTING SYSTEM FOR PERIPHERAL JET GROUND EFFECT VEHICLE
Carl W. Weiland, % Aluminum Cruisers, Inc., Standiford Field, Louisville 13, Ky.
Filed Feb. 24, 1961, Ser. No. 91,429
8 Claims. (Cl. 180—7)

This invention relates to ground effect vehicles of the annular jet type, for example, those disclosed in my copending applications Serial Nos. 767,575, filed October 16, 1958 and 23,736, filed April 2, 1960.

Ground effect vehicles are supported above but in close proximity to the earth on a cushion of air at superatmospheric pressure interposed between the undersurface of the vehicle and the earth. The air cushion for vehicles of the type disclosed in the above-mentioned applications is created by sucking air into the vehicle and discharging it in the form of a downwardly and inwardly-directed jet-like curtain of air extending around the periphery of the vehicle. The curtain also serves as an air-seal for the cushion. In a vehicle which is circular in plan form, the curtain is annular. Hence, the term annular jet, although the term peripheral jet would be more appropriate.

The rate of discharge of such air curtain is sufficient to create, and also act as an air seal for, the cushion pressure necessary to raise the vehicle to, and maintain it at, a stable elevation above the earth. Since air from the supporting cushion and/or the curtain constantly moves outwardly around the periphery of the vehicle and must be replaced, a large volume of air constantly is passing through the vehicle. The movement of such a large volume of air requires the use of large-capacity air impellers.

In the above-described applications two types of multiple axial-flow impeller and ducting systems are disclosed for developing a jet-like curtain of air that has a substantially uniform flow rate all along the periphery of the vehicle. In a large vehicle which of necessity requires a plurality of impellers in order to avoid unreasonably large impeller sizes, one method of achieving the aforementioned desired uniformity of flow rate employs a plenum chamber to which air is supplied by a plurality of impellers and from which air flows substantially uniformly to all parts of the elongated nozzle which forms the cushion-creating jet-like curtain of air. The use of a plurality of small impellers, even to supply air to a plenum chamber, in the manner disclosed in the aforementioned application Serial No. 23,736 wherein each impeller is mounted on a separate shaft, gives rise to problems. Either each impeller must be driven by a separate engine, or multiple shafts and gears provided to drive all of the impellers from a single engine. Moreover, the design of a plenum chamber to achieve the desired uniformity of flow rate throughout the entire extent of a jet-forming nozzle can be accomplished only with difficulty.

There also is shown in both of the aforementioned applications an alternate arrangement for achieving the desired uniformity of flow throughout the entire extent of a peripheral curtain-forming nozzle. Such arrangement involves the use of a plurality of impellers spaced about the periphery of the vehicle, with each impeller supplying air to a portion of the peripheral extent of the nozzle. In the arrangements disclosed in the aforementioned applications, the impellers rotate about separate axes which are disposed generally normal to their corresponding portion of the peripheral outline of the vehicle. Such an arrangement, of necessity, complicates the problem of driving the impellers. Again each impeller must be powered by a separate engine, or a complicated multiple shafting and gearing arrangement must be provided in order to drive all of the impellers from a single engine. Of course, such a driving arrangement not only becomes complicated and requires the use of much space, but also is inefficient because of the necessity of multiple gears to drivingly connect the various shafts.

Accordingly, it is a primary object of this invention to provide an improved impeller or blower arrangement for supplying air uniformly throughout the entire peripheral extent of the cushion-creating nozzle of a peripheral jet ground effect vehicle.

It is another object of this invention to provide an improved impeller and ducting system for a peripheral jet ground effect vehicle, which employs a minimum number of driving shafts and which is as compact as possible.

It is another object of this invention to provide an improved impeller and ducting system for a ground effect vehicle of the peripheral jet type which can efficiently handle large quantities of air at low pressure, and which is mechanically simple with consequent manufacturing and operating economies.

Other objects and advantages of the invention will become apparent from the following description and accompanying drawings in which:

FIGURE 1 is a plan view of a ground effect vehicle embodying this invention.

FIGURE 2 is a front view of the vehicle shown in FIGURE 1.

FIGURE 3 is an enlarged longitudinal vertical sectional view taken substantially on line 3—3 of FIGURE 1.

FIGURE 4 is a sectional view taken substantially on line 4—4 of FIGURE 1.

FIGURE 5 is a fragmentary sectional view taken substantially on line 5—5 of FIGURE 3.

FIGURE 6 is an enlarged fragmentary view of a portion of FIGURE 4.

FIGURE 7 is a fragmentary sectional view taken substantially on line 7—7 of FIGURE 6.

FIGURE 8 is a fragmentary sectional view taken substantially on line 8—8 of FIGURE 6, but with certain elements omitted in order to illustrate details.

FIGURE 9 is a view corresponding to FIGURE 8 but with still further elements omitted in order to illustrate details.

FIGURE 10 is an enlarged fragmentary view corresponding to FIGURE 6, but illustrating a modified form of the invention.

Referring now to FIGURES 1–4 of the drawings, there is shown a ground effect vehicle of the peripheral jet type. Such vehicle may consist of a main body 12, which in the present instance is shown as being generally rectangular in plan view and of aircraft fuselage construction. The main body 12 is interiorly enlarged to provide a passenger and cargo-carrying compartment 14. Rearwardly of such compartment 14 the body 12 may also be interiorly enlarged to provide an engine room 16 wherein may be located a single engine 18 to provide power for lifting and supporting the vehicle at a stable elevation above the earth 20, as described more in detail hereinafter. Preferably, the lower portion of the main body 12 is of boat-like water-tight construction so that the entire vehicle will float when it alights on water. The rectangular undersurface 22 of the main body 12 is substantially flat and air-tight.

Surrounding and extending along all the edges of the vehicle undersurface 22 is an endless nozzle 24 adapted to discharge a downwardly and inwardly-directed jet-like curtain of air 26, as indicated by the arrows in FIGURES 3, 4 and 6. The curtain 26 not only develops a cushion of air at superatmospheric pressure between the undersurface 22 of the vehicle and the earth 20, sufficient to raise the vehicle to a stable elevation above the earth, but also inhibits or restrains the outflow of air from such cushion and so acts as an air seal therefor. Preferably, the lower exterior portions of the side and end walls of the main body 12 are inwardly and downwardly inclined to form the inner side wall 28 of the nozzle 24, while the outer side wall of the nozzle may be formed by flat plates 30 secured to the main body by spaced upright flow-straightening vanes 32 located within the nozzle.

Secured to and extending along the exterior of each side and end wall of the main body 12 and covering the inlet end of the nozzle 24 as shown best in FIGURE 6, is a cylindrical housing 34. Preferably the trough between the upper side of each housing 34 and the main body 12 is covered by a fairing plate 36. Because the nozzle 24 is generally rectangular in plan view, four such housings 34 are provided, as shown in FIGURE 5, but since the impeller and ducting arrangement associated with each housing are identical, a description of one will suffice for all. The lower inner quadrant of the wall of each housing is provided along its length with a row of closely-spaced elongated outlet openings 38 which communicate directly, and are substantially coextensive in width with the inlet end of the nozzle 24. Due to the construction illustrated, the width of the openings 38, circumferentially of the housing, may be of the order of 90°. The length of each opening 38 preferably exceeds its width, as shown in FIGURES 8 and 9. The lower outer quadrant of the wall of each housing 34 is provided along its length with a row of inlet openings 40 substantially coextensive in length and width with the outlet openings 38 and circumferentially both aligned therewith and closely adjacent thereto.

Coaxially mounted within each housing 34, as best shown in FIGURE 7, is an impeller shaft 42 carrying spaced axial-flow impellers 44 which may have hubs 46 of relatively large diameter from which project a plurality of radial blades 48. All of the impellers 44 are arranged to move air in the same direction, e.g., to the right as shown by the arrows in FIGURE 7, and each impeller is located longitudinally between adjacent outlet openings 38, so that there is an extended housing section between each pair of adjacent impellers. Within each housing section is a tubular shell section 50 coaxially surrounding the shaft 42. Each shell section 50 extends into close proximity, at its opposite ends, with the hubs 46 of the impellers 44 at the opposite ends of the corresponding housing section, and is of a diameter substantially equal to that of such hubs. Thus, the pairs of housing and shell sections define annular spaces for flow of air to and from the impellers 44.

Within the lower portion of, and secured to and extending between the sections defining, each annular space is a flat upright vane 52 which extends coextensively along and between the laterally adjacent edges of the openings 38 and 40 thus separating the latter from each other.

Secured within and spanning the annular space is a helical vane 54 that has a counterclockwise 360° twist as viewed in FIGURE 6, and extends from end to end of the straight vane 52, as shown in FIGURES 7 and 8. In addition to their function of controlling air flow, the vanes 52 and 54 serve as supports for the inner shell section 50, while the shaft 42 may be journalled in appropriate bearing mounts 56 within the shell sections.

From the foregoing construction, it will be seen that each impeller 44 forces air toward the right as shown in FIGURE 7, into a discharge duct 58 in the form of a longitudinally tapering segment of an annulus having a helical side wall defined by the helical vane 54. Such helical wall smoothly turns the general axial flow of air into the duct 58 from the impeller to a generally radial outward flow through the corresponding outlet opening 38 and into the inlet end of the nozzle 24. Of course, such flow will have an axial component due ot its general spiral nature, but such axial component may be substantially removed in the air curtain 26 formed by the nozzle 24 by the flow-straightening vanes 32 within the latter. The air supplied to each impeller 44 passes through an intake duct 60 in the housing section in advance of the section from which the air is discharged. The intake duct 60 essentially is of reversed configuration from the discharge duct 58, i.e., in the form of a longitudinally diverging segment of an annulus having a helical side wall defined by the other side of the vane 54. Thus, air passing generally radially through the inlet opening 40 into each intake duct 60 is smoothly turned by the helical wall to a generally axial flow into each impeller 44. Thus, a large number of relatively small axial-flow impellers can be mounted on a common shaft, and, by the ducting arrangement shown, be used to supply air substantially uniformly along the entire extent of a peripheral curtain-forming nozzle of a ground effect vehicle.

In the particular embodiment shown, the recirculation principle disclosed in my aforementioned application Serial No. 23,736 may easily be incorporated. Thus, a thin wall or plate 62 depends from the outer side of each housing 34 along the outer edges of the row of inlet openings 40 with the lower edge of such wall terminating in the same plane as the edges of the mouth of the nozzle 24. Preferably, the lower edge portion of such wall 62 is inclined inwardly, as best shown in FIGURE 6, and the wall is strengthened by upright flow-straightening vanes 64 which are secured to and extend between the wall 62 and the outer side wall 30 of the nozzle 24. Thus, there is provided between the walls 24 and 62 an endless intake opening 66, parallel to and just outwardly of the mouth of the nozzle 24. Through the opening 66, a large portion of the air escaping outwardly from the periphery of the supporting-cushion of air between the undersurface 22 of the vehicle 12 and the earth 20, is sucked back into the impellers 44 for recirculation thereby, as is shown in FIGURE 6.

The shafts 42 in the four cylindrical housings 34 may be connected together, at their ends, by bevel gears 68, so that the single engine 18 may drive all of the shafts by being connected to the rear shaft through bevel gears 70, as shown in FIGURE 5. Of course, power may be supplied by more than one engine, all of which may be drivingly connected to any of the shafts 42 and located within the vehicle body 12 in an appropriate manner for trimming purposes. The bevel gears 68 at the ends of the shafts 42 may be located within corresponding right-angled or elbow shell sections 72. Similarly, the elbowed annular space within the connected ends of the housings 34 may be spanned by duct-forming straight and helical vanes that are bent for accommodation to such space.

Preferably, the front an rear portions of the vehicle are provided with appropriately streamlined extensions 74 and 76 projecting forwardly and rearwardly, respectively, of the main body 12, as shown in FIGURE 3. Forward propulsion of the vehicle may be achieved in any suitable manner, but preferably is accomplished by air propellers 78 driven by appropriate engines (not shown) mounted in nacelles 80 secured to the leading edges of one or more vertical stabilizers 82 located at the rear end of the vehicle, two such stabilizers being shown in FIGURES 1 and 2 of the drawings. The vertical stabilizers 82 preferably are connected by a horizontal stabilizer 84 provided with elevators 86 for trimming purposes.

The impeller and ducting system described above may be applied with equal efficiency to a peripheral jet ground effect vehicle which makes use of a labyrinth seal for impeding the outward flow of air from the periphery of the air cushion. Such an application is shown in FIGURE 10. The arrangement there shown includes a nozzle 88 identical to the nozzle 24 disclosed in the previously described embodiment and supplied with air from the outlet openings 90 of a cylindrical housing 92 having impellers 94, shell section 96, flat vanes 98, and helical vanes 100 therein similar to the housing 34, impellers 44, shell sections 50, flat vanes 52, and helical vanes 54. The row of inlet openings 102 for the housing 92 are located, however, in the upper left hand guadrant of the wall of the housing 92, instead of in the lower right-hand quadrant as in the housing 34 of the previously described embodiment. Correspondingly, the straight flat vanes 98 secured to and extending between the housing 92 and shell sections 96 therein are disposed substantially horizontally within the left-hand portion of the annular spaces between the sections so that such vanes will be in a position to separate the inlet openings 102 from the outlet openings 90. Likewise, the helical vanes 100 which extend from end to end of the flat vanes 98 within the annular spaces between the housing 92 and shell sections 96 have a twist, with respect to the direction of air movement by the impellers 94, so that each impeller will receive air from an inlet opening 102 in one section of the housing 92 and feed it to an outlet opening 90 in an adjacent housing section and into the nozzle 88 to form the downward and inwardly directed jet-like curtain of air indicated by the arrows 104.

Spaced horizontally outwardly beyond the housing 92 is another cylindrical housing 106 having impellers 108, shell sections 110, straight vanes 112, and helical vanes 114 therein identical to the inner housing 92. The housing 106 also is provided with a longitudinal row of outlet openings 116 in its left-hand lower quadrant and a longitudinal row of inlet openings 118 in its upper left-hand quadrant identical to the housing 92. Downwardly and inwardly inclined plates or walls 120 and 122 depend from the extreme left-hand and lower portions of the housing 106 along the lateral edges of the outlet openings 116 to define another curtain-forming nozzle 124 substantially identical to the nozzle 88 and spaced outwardly therebeyond. A covering plate 126 extends between and is secured to the tops of the housings 92 and 106 so as to define, in conjunction with the outer wall of the nozzle 88 and the inner wall 120 of the nozzle 124, and the right-hand side of the inner housing 92, an intake duct 128 for receiving air flowing outwardly from the periphery of the cushion and conducting the same into the longitudinal row of inlet openings 118 located in the upper left-hand quadrant of the outer housing 106. Such air will be discharged through the outlet openings 116 into the inlet end of the outer nozzle 124 so that the latter will form a second downwardly and inwardly-directed jet-like curtain of air, indicated by the arrows 130, spaced outwardly beyond the inner air curtain 104. This second curtain 130, in accordance with the principles of labyrinth sealing, forms another air seal for the cushion to create a further hinderance to the escape of air therefrom outwardly from beneath the vehicle. Preferably, the nozzle walls 120 and 122 are spanned by upright flow-straightening vanes 132 and the walls forming the intake duct 128 are similarly spanned by upright flow-straightening vanes 134. These vanes 132 and 134, together with the cover plate 126, may serve as supports for the housing 106.

Spaced above the two housing 92 and 106 and extending outwardly from the outer side of the vehicle main body 136 over the two housings, is a plate-like covering member 138 which merges, at its outer edge, into a depending wall member 140 spaced outwardly beyond the outer housing 106. The depending wall member 140 terminates at its lower edge, in an inwardly inclined portion 142. Preferably the lower edge of the portion 142 is in the same plane as the edges of the mouths of the nozzles 88 and 124. The members 138 and 140, together with the outer wall 122 of the nozzle 124, the outer side of the housing 106, the cover plate 126, and a portion of the outer side of the main body 136, define a recirculation intake duct 144 for receiving a major portion of the air which moves outwardly from beneath the vehicle, and conducting the same back to the inlet openings 102 to the inner housing 92 for re-emission as the inner curtain 104.

The impeller shaft 146 within the inner housing 92 may be driven by one or more engines (not shown) in the manner previously described, while the impeller shaft 148 in the outer housing 106 may be driven by a simple shaft and bevel gear connection (not shown) with the shaft 146. Thus, the complicated shaft and gearing arrangements for achieving a proper flow of air in a labyrinth seal, as disclosed in the above-mentioned applications, has been greatly simplified by means of this invention.

It thus will be seen that the objects of this invention have been fully and effectively accomplished. It will be realized, however, that the foregoing specific embodiments have been shown and described only for the purpose of illustrating the principles of this invention and is subject to extensive change without departure from such principles. Therefore, this invention includes all modifications encompassed within the spirit and scope of the following claims.

I claim:

1. A ground effect vehicle comprising: a body having a substantially airtight undersurface; elongated nozzle means mounted to said body and extending along at least a portion of the periphery of said undersurface for emitting a downwardly-directed jet-like curtain of air along said peripheral portion at a rate sufficient to create between said undersurface and the earth a cushion of air under superatmospheric pressure sufficient to raise and maintain said body to and at a stable elevation above the earth; a cylindrical housing mounted to said body and extending generally parallel to said nozzle means adjacent to the inlet thereto; a shaft journalled coaxially within said housing; a plurality of axial-flow impellers mounted on said shaft in generally uniformly spaced relation and arranged to move air in the same direction, the side wall of each section of said housing extending between each pair of adjacent impellers having an inlet opening and an outlet opening extending substantially the length of said section and communicating directly with said nozzle means; and baffle means within each of said housing sections separating the outlet opening of said section from the corresponding inlet opening.

2. The structure defined in claim 1 in which each inlet opening is substantially co-extensive in length with the corresponding outlet opening and each pair of corresponding inlet and outlet openings are closely adjacent circumferentially of the housing and the baffle means includes a helical section for smoothly turning a substantial portion of the axial flow of air from the impeller which moves air into the corresponding housing scetion to a generally radial flow into said outlet and for smoothly turning a major portion of the generally radial flow of air into said inlet to a generally axial flow into the impeller at the opposite end of said housing section.

3. The structure defined in claim 2 in which the impellers have hubs and including a cylindrical shell section, of a diameter substantially equal to that of said hubs, coaxially surrounding the shaft within each housing section with the helical section of the baffle means spanning the annular space between said shell and housing section, and wherein said baffle means further includes a flat section extending longitudinally of said housing and radially spanning said space at a location between said openings.

4. A blower assembly comprising: a cylindrical housing; a shaft journalled coaxially therewithin; a plurality of axial-flow impellers mounted on said shaft in generally uniformly spaced relation to define substantially equi-length housing sections between adjacent impellers, the latter being arranged to move air in the same direction, the side wall of said housing having a row of inlet openings disposed longitudinally thereof, one for each housing section, and a row of outlet openings disposed longitudinally thereof, one for each housing section, each of said outlet openings extending substantially the length of the corresponding housing section; and baffle means within each housing section and separating the outlet opening of said section from the inlet opening of said section for smoothly converting a major portion of the axial flow of air into said section from an impeller at one end thereof to generally radial flow out of the outlet opening of said section and for smoothly converting a major portion of the radial flow of air into the inlet opening of said section to generally axial flow into the impeller at the other end of said section.

5. The structure defined in claim 4 in which the inlet opening in each housing section is substantially coextensive in length and width with the corresponding outlet opening and closely adjacent thereto, and the baffle means includes a generally helical portion extending circumferentially of the order of 360° and axially from end to end of said section and a flat radial portion extending from end to end of said section between said openings.

6. The structure defined in claim 5 including an elongated nozzle mounted to the housing, extending substantially the length thereof, generally radially therefrom, and in substantially direct communication with all of the outlet openings for creating a jet-like curtain of air.

7. The structure defined in claim 5 including an elongated nozzle mounted to the housing, extending substantially the length thereof, generally radially therefrom, and in substantially direct communication with all of the outlet openings for creating a jet-like curtain of air, and flow-straightening vanes secured to and extending between the side walls of said nozzle.

8. The structure defined in claim 5 in which the impellers have hubs and including a cylindrical shell section mounted coaxially within each housing section and of a diameter substantially equal to said hubs, and wherein the portions of the baffle means span the annular space between said shell and housing sections.

References Cited by the Examiner

UNITED STATES PATENTS

| 1,621,625 | 3/27 | Casey | 180—7 |
| 1,932,881 | 10/33 | Bowen et al. | 230—122 X |
| 3,117,646 | 1/64 | Cockerell | 180—7 |

FOREIGN PATENTS

| 1,240,721 | 8/60 | France. |
| 323,658 | 1/30 | Great Britain. |

OTHER REFERENCES

"Symposium on Ground Effect Phenomena," presented October 21–23, 1959.

FERGUS S. MIDDLETON, *Primary Examiner*.

PHILIP ARNOLD, A. HARRY LEVY, MILTON BUCHLER, *Examiners*.